United States Patent
Chen et al.

(10) Patent No.: US 9,846,705 B2
(45) Date of Patent: Dec. 19, 2017

(54) TECHNIQUES FOR MANAGING A DATA REPLICATION MODE

(71) Applicant: INTERNATIONAL BUSINESS MACHINES CORPORATION, Armonk, NY (US)

(72) Inventors: Lei Chen, Shang Hai (CN); Yi Yang, Shanghai (CN); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 14/263,605

(22) Filed: Apr. 28, 2014

(65) Prior Publication Data
US 2014/0324774 A1   Oct. 30, 2014

(30) Foreign Application Priority Data

Apr. 28, 2013   (CN) .......................... 2013 1 0155947

(51) Int. Cl.
G06F 17/30   (2006.01)
(52) U.S. Cl.
CPC .............................. G06F 17/30215 (2013.01)
(58) Field of Classification Search
CPC ........... G06F 11/2071; G06F 17/30008; G06F 17/30368
USPC .......................... 707/611, 692, 613; 711/162
See application file for complete search history.

(56) References Cited

U.S. PATENT DOCUMENTS

| | | | |
|---|---|---|---|
| 5,937,414 A | 8/1999 | Souder et al. | |
| 7,219,103 B2* | 5/2007 | Vasudevan | G06F 17/30575 707/613 |
| 7,457,830 B1* | 11/2008 | Coulter | G06F 11/1471 |
| 7,636,821 B2 | 12/2009 | Griffin et al. | |
| 8,055,943 B2 | 11/2011 | Edel et al. | |
| 8,190,838 B1 | 5/2012 | Sivasubramanian | |

(Continued)

FOREIGN PATENT DOCUMENTS

CN    101388759 A    3/2009
JP      4752334 B2    8/2011

OTHER PUBLICATIONS

Wang et all."ARPRG: An asynchronous replication protocol with RPO guarantee," Computer Engineering and Technology (ICCET), 2010 2nd International Conference on , vol. 1, No., pp. V1-611,V1-615, Apr. 16-18, 2010 URL: http://ieeexplore.ieee.org/stamp/stamp.jsp?tp=&arnumber=5485935&isnumber=5485364.

(Continued)

Primary Examiner — Jeffrey A Burke
Assistant Examiner — Thong Vu
(74) Attorney, Agent, or Firm — Michael R. Long; Randall J. Bluestone

(57) ABSTRACT

A technique for managing a data replication mode between a primary storage device and a secondary storage device includes in response to a data replication state between the primary storage device and the secondary storage device satisfying a first predetermined condition, selecting at least one candidate logical unit from a plurality of logical units implementing synchronous replication in the primary storage device at least according to priority information of the plurality of logical units. A data replication mode of the at least one candidate logical unit is then modified from synchronous replication to asynchronous replication.

14 Claims, 4 Drawing Sheets

(56) References Cited

U.S. PATENT DOCUMENTS

| | | | |
|---|---|---|---|
| 8,301,593 B2 | 10/2012 | Hoffmann et al. | |
| 8,341,115 B1 | 12/2012 | Natanzon et al. | |
| 9,002,805 B1* | 4/2015 | Barber | G06F 17/30303 |
| | | | 707/692 |
| 2003/0041074 A1 | 2/2003 | Vasudevan et al. | |
| 2004/0024975 A1* | 2/2004 | Morishita | G06F 3/0605 |
| | | | 711/147 |
| 2007/0106712 A1* | 5/2007 | Yamato | G06F 11/2064 |
| 2008/0177963 A1 | 7/2008 | Rogers | |
| 2009/0313311 A1 | 12/2009 | Hoffmann et al. | |
| 2010/0138621 A1* | 6/2010 | Arifin | G06F 3/0625 |
| | | | 711/162 |
| 2010/0275055 A1* | 10/2010 | Edel | G06F 11/2064 |
| | | | 714/6.12 |
| 2011/0252262 A1* | 10/2011 | Yoshihara | G06F 3/061 |
| | | | 713/375 |
| 2014/0074834 A1* | 3/2014 | Pike | G06F 17/30091 |
| | | | 707/736 |

OTHER PUBLICATIONS

Cano, Charlie (Solution Architect) "Accelerating Data Replication with F5 WAN Jet and EMC Mirror View/Asynchronous." F5 White Paper, 12 pages, Apr. 2008.

Natanzon et al., "Dynamic synchronous/asynchronous replication" ACM Transactions on Storage (TOS), vol. 9 Issue 3, Article No. 8, Aug. 2013.

Wang Et All."ARPRG: An asynchronous replication protocol with RPO guarantee," Computer Engineering and Technology (ICCET), 2010 2nd International Conference on , vol. 1, No., pp. V1-611,V1-615, Apr. 16-18, 2010 URL: http://ieeexplore.ieee.org/stamp/stamp.jsp?tp=&,arnumber=5485935&isnumber=5485364.

* cited by examiner

TECHNIQUES FOR MANAGING A DATA REPLICATION MODE

This application claims priority to Chinese Patent Application No. 201310155947.5, entitled "SYSTEM AND METHOD TO PROVIDE SMART TUNING FOR SYNC AND ASYNC MIRRORING IN STORAGE SUBSYSTEM," filed Apr. 28, 2013, the disclosure of which is hereby incorporated herein by reference in its entirety for all purposes.

BACKGROUND

The disclosure is generally directed to managing data replication and, more particularly, to techniques for managing a data replication mode from primary storage to secondary storage.

In order to improve the security of data storage and to prevent the occurrence of disasters, it is often required to replicate data in a primary storage to a secondary storage, so as to make a backup of data. Generally, two technologies in the prior art, synchronous replication and asynchronous replication, are used to implement data backup.

FIGS. 1A and 1B show processes of data replication in the prior art, with FIG. 1A showing a process of synchronous replication and FIG. 1B showing a process of asynchronous replication. Specifically, as shown in FIG. 1A, in the case of synchronous replication, a mirroring relationship is established between a primary storage device and a secondary storage device in advance. Whenever the primary storage device receives, from a locally connected host, a command of writing data (step (1)), it not only writes data in its local disk system according to the command, but also forwards the data to the secondary storage device (step (2)). Once the secondary storage device completes data writing, it will return a notification of writing completion to the primary storage device (step (3)). Upon the receipt of such notification, the primary storage device will return a report of writing completion to the host (step (4)). Therefore, with a scheme of synchronous replication, both the primary storage device and the secondary storage device maintain the latest updates. Usually, the primary storage device and the secondary storage device are connected remotely and implement high-speed data replication through an optical fiber network. Such data replication is also called Synchronous Mirror.

In the case of asynchronous replication, as shown in FIG. 1B, whenever the primary storage device receives a command of writing data from a locally connected host (step (1)), it will write data in its local disk system according to the command, and immediately returns a report of writing completion to the host (step (2)). After a certain time interval, the primary storage device forwards data updated during the time interval to the secondary storage device (step (3)). After the secondary storage device completes writing of the updated data, it returns a notification of writing completion to the primary storage device (step (4)). Such data replication is also called Asynchronous Mirror.

Recover Point Object (RPO) is often used in the prior art to describe disaster tolerance capability of a system. Specifically, RPO refers to such a time point before the disaster that data at this time point can be recovered by the system after the occurrence of the disaster. Or in other words, RPO is an index measuring how much data will be lost after the occurrence of the disaster. In the synchronous replication mode, each group of data written to the primary storage device will be backed up synchronously to the secondary storage devices, whereby in the synchronous replication mode RPO=0. In the asynchronous replication mode, there is a time interval between local writing and remote backup of data, whereby RPO>0. More specifically, the value of RPO depends on the time interval for data backup.

Obviously, since in the synchronous replication mode RPO=0, a system employing synchronous replication has stronger disaster tolerance. However, on the other hand, synchronous replication needs to forward data of the primary storage device in real-time to the secondary storage device through a network, thereby needing to occupy a large amount of network bandwidth. When there isn't sufficient network bandwidth resource, the performance of the whole system related with the primary storage devices will be impacted. In contrast, in the asynchronous replication mode, RPO>0, disaster tolerance is not ideal relatively; however, this replication mode occupies a relatively small amount of bandwidth resource, and thus has less impact on the performance of the whole system.

In the prior art, the data replication mode of a storage system is often fixed, so that the storage system cannot be well adapted to different network conditions. Therefore, it is desired to propose an improved scheme so that the storage system can be better adapted to different RPO requirements and bandwidth conditions.

BRIEF SUMMARY

A technique for managing a data replication mode between a primary storage device and a secondary storage device includes, in response to a data replication state between the primary storage device and the secondary storage device satisfying a first predetermined condition, selecting at least one candidate logical unit from a plurality of logical units implementing synchronous replication in the primary storage device at least according to priority information of the plurality of logical units. A data replication mode of the at least one candidate logical unit is then modified from synchronous replication to asynchronous replication.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, an apparatus, and a computer program product for testing software.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

Figure 2:
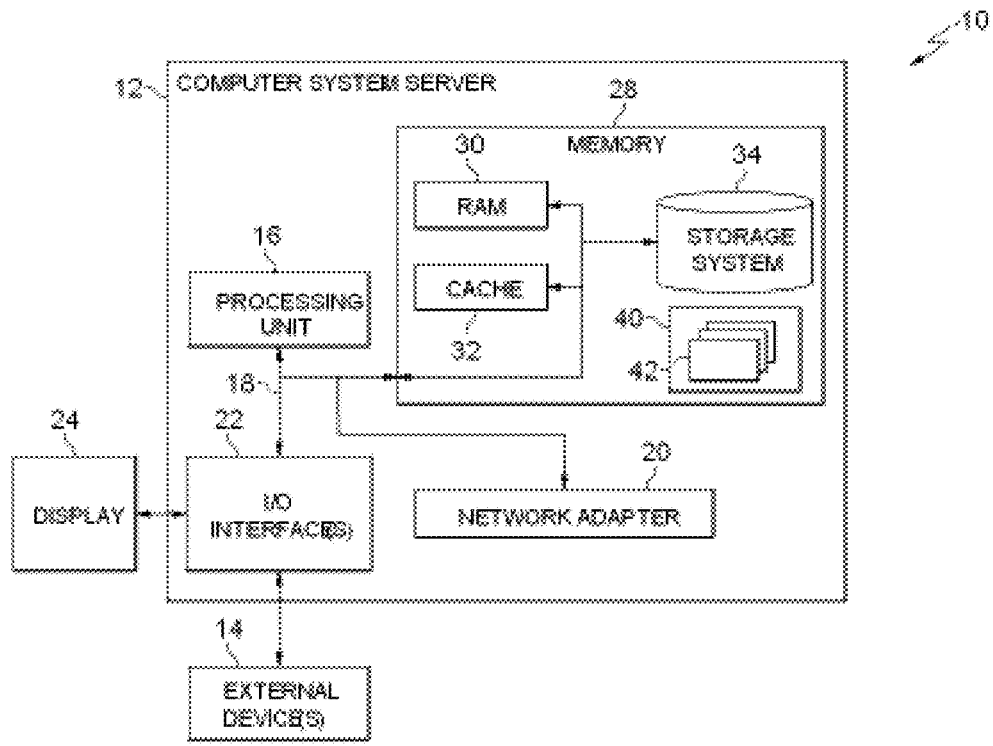
FIG. 2 shows a block diagram of an exemplary computer system/server that implements embodiments of the present disclosure.

Referring now to FIG. 2, in which an exemplary computer system/server 12 that implements embodiments of the present disclosure is shown. Computer system/server 12 is only illustrative and is not intended to suggest any limitation as to the scope of use or functionality of embodiments of the invention described herein.

As shown in FIG. 2, computer system/server 12 is shown in the form of a general-purpose computing device, that takes the form of a special purpose computing device when programmed. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and may include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The embodiments of the present disclosure are described below in conjunction with drawings. As known to those skilled in the art, typically, a storage device consists of a plurality of logical units which are usually indicated by LUN (logical unit number). In order to back up data of a primary storage device to a secondary storage device, a mirroring relationship is generally established between the primary storage device and the secondary storage device in advance. Such mirroring relationship actually consists of mirroring relationships between logical units LUN of the primary storage device and of secondary storage device respectively. According to an embodiment of the disclosure, in order to make data replication of a storage device adapt to different network environments more flexibly, taking a logical unit contained in the primary storage device as a unit, switching is performed between synchronous replication and asynchronous replication. Specifically, when it is detected that bandwidth for data replication between the primary storage device and the secondary storage device is deficient, a candidate logical unit is selected according to priorities of respective logical units in the primary storage device, and optionally, also according to data transmission rates of respective logical units, and then data replication mode of the candidate logical unit is modified from synchronous replication to asynchronous replication so as to reduce the impact by bandwidth pressure on storage device performance. The embodiments implementing the above concept are described specifically below.

Figure 3:
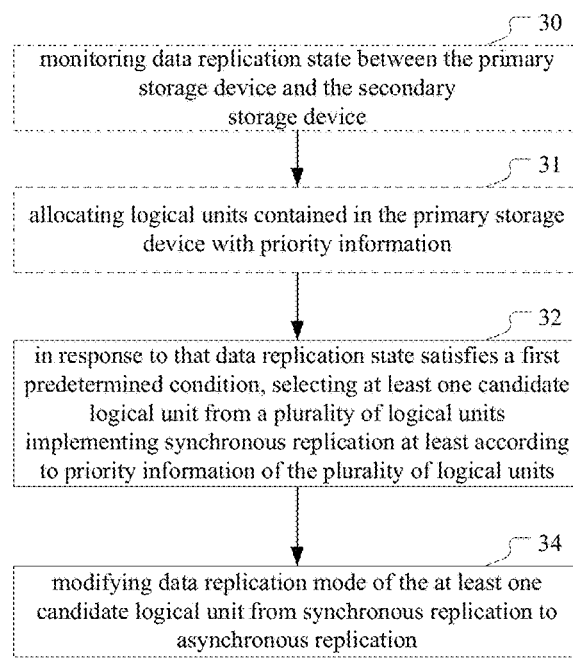
FIG. 3 shows a flowchart of a method according to one embodiment of the present disclosure.

Now referring to FIG. 3, which shows a flowchart of a process according to one embodiment of the present invention. As shown in FIG. 3, in step 32, in response to that data replication state between the primary storage device and the secondary storage device satisfying a first predetermined condition, at least one candidate logical unit is selected from a plurality of logical units implementing synchronous replication in the primary storage device at least according to priority information of the plurality of logical units; and, in step 34, a data replication mode of the at least one candidate logical unit is modified from synchronous replication to asynchronous replication. Ways to execute the above steps are described below in conjunction with specific examples.

Figure 1A:
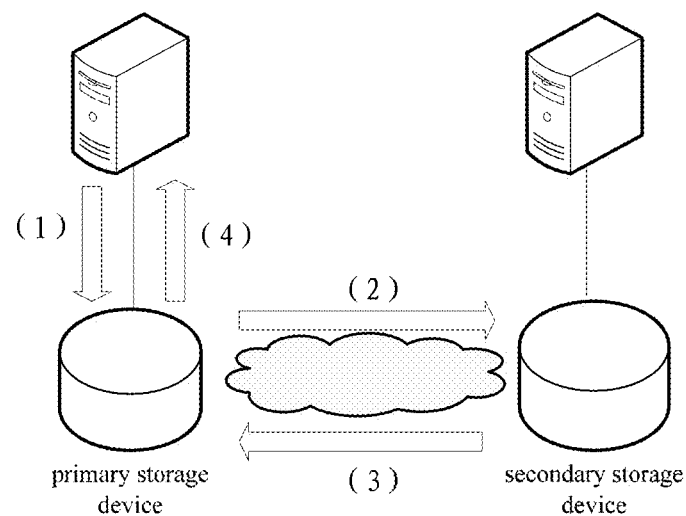
FIGS. 1A and 1B shows processes of data replication in the prior art.
Figure 1B:
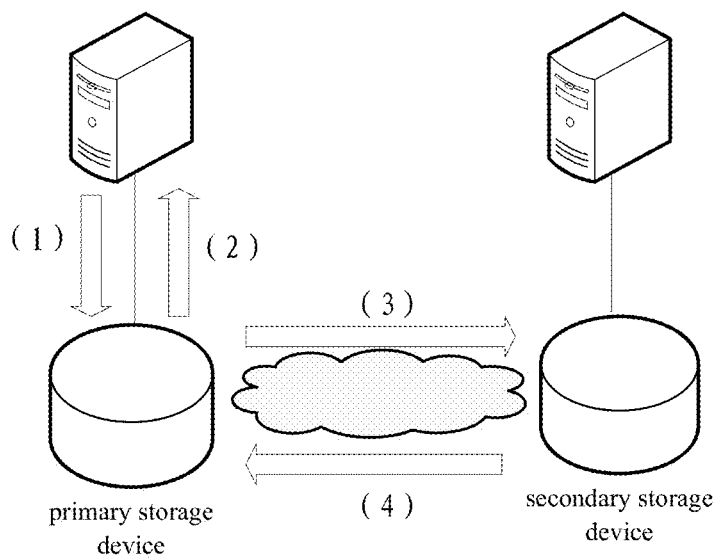

In one embodiment, in order to execute step 32, the process further comprises a step 30 (denoted by dashed line) of monitoring parameters related with data replication state between the primary storage device and the secondary storage device to determine the data replication state. Specifically, in one example, step 30 comprises monitoring a total data transmission rate for data replication between the primary storage device and the secondary storage device. In one example, step 30 comprises monitoring respective data transmission rates of respective logical units contained in the primary storage device. In another example, step 30 comprises monitoring respective write latency of respective logical units in the primary storage device. As shown in FIG. 1A, in case of synchronous replication, respective logical units of the primary storage device will return a report of writing completion to the host upon successfully replicating data to the corresponding logical units in the secondary storage device. A time interval from the moment at which the primary storage device receives a write command to the moment of returning the report of writing completion to the host may be referred to as write latency. When the bandwidth for data replication between the primary storage device and the secondary storage device is deficient, at least part of logical units in the primary storage device has to replicate data to a corresponding logical unit of the secondary storage device in reduced transmission rate, with the write latency thereof increased. Therefore, data replication states of respective logical units may be determined by monitoring write latency of respective logical units of the primary storage device. In one embodiment, step 30 further comprises recording the monitored history information related to the data replication states including, for example, historical data of transmission rates and historical data of write latency for respective logical units.

On the other hand, in one embodiment in order to execute step 32 the process further comprises a step 31 (denoted by dashed line) of allocating priority information for a plurality of logical units contained in the primary storage device. In one example, in step 31 priority information is allocated to the plurality of logical units in the primary storage device according to importance of applications corresponding to respective logical units. It should be appreciated that respective logical units in a storage device are usually associated with applications running thereon. For example, Application A related to a database is set to write data to a logical unit LUN A, while Application B related to email processing is set to write data to a logical unit LUN B. In such a case, Application A is associated with or corresponds to the logical unit LUN A, and Application B is associated with or corresponds to the logical unit LUN B. In the case where Application A is deemed as more important than Application B, accordingly, the logical unit LUN A is set to have higher priority than LUN B in the priority information. It should be appreciated that in different examples, the priority information of respective logical units may be represented as various forms like priority level, priority ranking, etc. It should be appreciated that the step of allocating priority may also be executed in advance before the flow of the process is performed.

On the basis of obtaining data replication state between the primary storage device and the secondary storage device and priority information of respective logical units, in step 32, in response to that data replication state between the primary storage device and the secondary storage device satisfying a first predetermined condition, at least one candidate logical unit is selected. It should be appreciated that the first predetermined condition corresponds to a state in which synchronous replication is impacted by deficient network resource between the primary storage device and the secondary storage device. Specifically, in one embodiment, the first predetermined condition may be that the total data transmission rate of data replication is greater than a first rate threshold. In one embodiment, the first predetermined condition may be that write latency of at least one logical unit in the primary storage device is greater than a first latency threshold. In other embodiments, the first predetermined condition may also be represented by other parameters related to data replication state. As mentioned previously, through monitoring various parameters associated with data replication state between the primary storage device and the secondary storage device in step 30, the data replication state above may be determined and judged. In the embodiment that the first predetermined condition is represented through the total data transmission rate, the first rate threshold is a value related to available bandwidth of the primary storage device. For instance, in one example, the first rate threshold is set to a maximum available bandwidth of the primary storage device. In another example, the first rate threshold is set to a predetermined ratio, such as 90% or 95%, of the maximum available bandwidth of the primary storage device. Once the total data transmission rate of data replication between the primary storage device and the secondary storage device reaches or exceeds the first rate threshold, it may be considered that the bandwidth of the primary storage device is deficient and the performance of the primary storage device might be impacted. In the embodiment that the first predetermined condition is represented through write latency, the first latency threshold may be a predetermined value related to normal write latency of synchronous replication. For instance, in one example, the first latency threshold may be set to 1.5 times normal write latency. In a case where data replication state between the primary storage device and the secondary storage device satisfies the first predetermined condition, in step 32, a candidate logical unit to be degraded is selected from a plurality of logical units implementing synchronous replication in the primary storage device at least according to the priority information of the plurality of logical units.

Specifically, in one embodiment, in step 32, a logical unit implementing synchronous replication in the primary storage device is first determined. It should be appreciated that the mirroring relationship established between the primary storage device and secondary storage device used for data replication consists of mirroring relationships between their respective logical units. Accordingly, a controller of the primary storage device may record mirroring relationships between respective logical units in the primary storage device and corresponding logical units in the secondary storage device and the record replication modes of the respective logical units. Based on such record, logical units implementing synchronous replication in the primary storage device may be determined. In one example, initially, all logical units contained in the primary storage device perform synchronous replication.

As to the determined plurality of logical units implementing synchronous replication, in one embodiment, they are ranked from high to low in priority and the logical unit having the lowest priority is selected as the candidate logical unit. In another embodiment, one or more logical units having lower priority than a priority threshold are selected from the above plurality of logical units as the above candidate logical unit(s).

Then, in step 34, the replication mode of the selected candidate logical unit is modified from synchronous replication to asynchronous replication. As mentioned above, the controller of the primary storage device may record mirroring relationships between respective logical units in the primary storage device and corresponding logical units of the secondary storage device and record their replication modes. Therefore, in step 34, the recorded replication mode may be modified with respect to the selected candidate logical unit, thereby "degrading" the replication mode of the candidate logical unit from synchronous replication to asynchronous replication. It should be appreciated that, through degrading the replication mode of the candidate logical unit to asynchronous replication, the data transmission rate or the occupied bandwidth for the candidate logical unit will be reduced.

In one embodiment, each time step 32 is performed, one logical unit with the lowest priority is selected as the candidate logical unit and then, in step 34, the replication mode of the candidate logical unit is degraded to asynchronous replication. In another embodiment, each time step 32 is performed, according to the priority ranking from high to low, a plurality of logical units are selected as the candidate logical units from the logical units implementing synchronous replication, and then their replication modes are modified in step 34.

Because degrading the replication mode of the candidate logical unit will reduce the occupied bandwidth, the total data transmission rate between the primary storage device and the secondary storage device will be reduced accordingly or data write latency will also be reduced accordingly. Therefore, it is determined once again whether the new data replication state still meets the first predetermined condition. In a case where the new data replication state still meets the first predetermined condition, steps 32 and 34 are performed repetitively, to continually select one or more candidate logical units from the remaining logical units implementing synchronous replication and to degrade their replication modes until the final data replication state does not satisfy the first predetermined condition.

In the embodiments above, a candidate logical unit to be degraded is selected according to the priority information of logical units implementing synchronous replication in the primary storage device. In order to make bandwidth pressure on the primary storage device alleviated more effectively by the degradation of the candidate logical unit, in one embodiment, contributions of respective logical units to bandwidth, namely, their respective data transmission rates, are further considered to select the candidate logical unit.

In one example, in step 32, a preliminary selection is made first considering the data transmission rates of respective logical units and then a further selection is made based on the priority information to determine the candidate logical unit. Specifically, firstly, preliminary candidate logical units having data transmission rates greater than a specific value are selected from the plurality of logical units implementing synchronous replication and then the candidate logical unit is selected according to the priorities of the preliminary candidate logical units. For example, a logical unit whose priority is the lowest or below a priority threshold in the preliminary candidate logical units may be selected as a final candidate logical unit.

In one embodiment, in step 32, a preliminary selection is made first considering the priority information of respective logical units and then a further selection is made based on the data transmission rates to determine the candidate logical unit. Specifically, firstly, at least one preliminary candidate logical unit having a priority lower than a specific priority is selected from the plurality of logical units implementing synchronous replication and then at least one candidate logical unit is selected from the at least one preliminary candidate logical unit according to the data transmission rate of the at least one preliminary candidate logical unit. In one example, the specific priority is a predetermined priority level. In another example, a target logical unit to be protected may be determined and the priority of the target logical unit is taken as the specific priority. That is to say, taking the target logical unit as reference, the candidate logical units are selected according to the priority information and data transmission rates of respective logical units.

Figure 4:
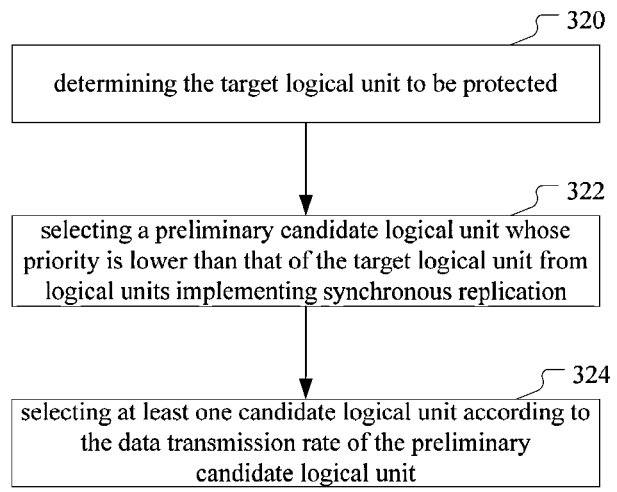
FIG. 4 shows process steps of selecting a candidate logical unit according to one embodiment.

FIG. 4 shows process steps of selecting a candidate logical unit according to one embodiment, i.e., substeps of step 32 shown in FIG. 3. As shown in FIG. 4, in order to select at least one candidate logical unit to be degraded, first in step 320, a target logical unit to be protected is determined. In step 322, at least one preliminary candidate logical unit whose priority is lower than that of the target logical unit is selected from logical units implementing synchronous replication in the primary storage device. In step 324, at least one candidate logical unit is selected according to the data transmission rate of the at least one preliminary candidate logical unit.

Specifically, first, in step 320, the target logical unit is determined. In one embodiment, the target logical unit is determined as a logical unit having a highest priority in at least one logical unit whose synchronous replication is impacted by bandwidth deficiency. It should be appreciated that once network bandwidth between the primary storage device and the secondary storage device is deficient, at least part of logical units or even all logical units in the primary storage device will be impacted by bandwidth deficiency. In the at least one logical unit impacted due to deficient bandwidth, the logical unit having the highest priority may be considered as the most important logical unit that is worthy of protection. Therefore, such logical unit is determined as the target logical unit. In order to determine such target logical unit, logical units whose synchronous replications are impacted by bandwidth are first determined. In one embodiment, write latencies of respective logical units implementing synchronous replication are obtained and logical units whose write latencies exceed a predetermined latency threshold are considered as logical units whose synchronous replications are impacted by bandwidth. In one embodiment, the data transmission rates of respective logical units implementing synchronous replication are obtained and logical units whose data transmission rates are less than a predetermined rate threshold are considered as logical units whose synchronous replications are impacted by bandwidth. It should be appreciated that write latencies and/or data transmission rates of the respective logical units may be obtained through the previous step 30. On this basis, a logical unit with the highest priority is selected from the logical units whose synchronous replications are impacted by bandwidth and is considered as the target logical unit.

Next, in step 322, at least one preliminary candidate logical unit having a priority lower than that of the target logical unit is selected from the logical units implementing synchronous replication. It should be appreciated that on the basis of determining the target logical unit, the at least one preliminary candidate logical unit may be obtained directly based on the priority information of respective logical units.

Further, in step 324, at least one candidate logical unit is selected according to the data transmission rate of the at least one preliminary candidate logical unit selected in step 322.

According to one embodiment, in step 324, the candidate logical unit is selected directly according to the current data transmission rate of the at least one preliminary candidate logical unit. In one example, the logical unit with the largest current data transmission rate is selected from the preliminary candidate logical units as the candidate logical unit. In another example, a plurality of logical units whose current data transmission rates are relatively great (for example, greater than a rate threshold) are selected from the preliminary candidate logical units as candidate logical units.

In order to make the selected candidate logical units suitable for a long time period in the future, so as to avoid frequent selection and degradation of candidate logical units, according to one embodiment, in step 324, data transmission rates in a future time period are estimated according to historical information of data transmission rates of the preliminary candidate logical units and at least one candidate logical unit is selected from the preliminary candidate logical units according to the estimated data transmission rates.

In one embodiment, estimating the data transmission rate of a certain preliminary candidate logical unit in a future time period comprises: obtaining data transmission rates of a certain preliminary candidate logical unit in a plurality of corresponding time periods in the past according to historical information of the certain primary candidate logical unit; and estimating the data transmission rate in a future time period based on the data transmission rates in the plurality of time periods in the past. For example, in one example, for a certain preliminary candidate logical unit (LUN), it is desired to predict its data transmission rate in the coming two hours, e.g., 10:00-12:00. As to this, data transmission rates of the LUN in the corresponding time periods in the past, for example, data transmission rates in 10:00-12:00 per day over the past 2 weeks, may be obtained according to the historical information of data transmission rate and data transmission rate in the next same time period is predicted based on data transmission rates in 10:00-12:00 per day in the past.

Specifically, in one embodiment, the data transmission rate DRT in a time period T of future may be estimated as: DRT=$\Sigma$DRi/n, wherein DRi represents the data transmission rate in the ith corresponding time period Ti in the past, and n is the number of obtained corresponding time periods in the past.

In another embodiment, the data transmission rate DRT in a future time period T may be estimated as:

$$DRT = \sum_{i=1}^{n} w_i * DR_i$$

where DRi represents the data transmission rate in the ith corresponding time period Ti in the past, and $w_i$ is the weight of the ith time period Ti. In one embodiment, $w_i$ depends on interval from the ith time period Ti to the current moment. For example, the closer Ti is from the current moment, the larger the reference value of corresponding data transmission rate DRi is, and thus the larger the weight $w_i$ of Ti.

In one embodiment, the data transmission rate of a certain preliminary candidate logical unit in a future time period may be estimated hierarchically. This is applicable in particular for a case where the time period to be estimated is relatively long. Specifically, a time period P of future to be estimated may be divided into a plurality of sub-periods. For each sub-period Tj, data transmission rates in a plurality of corresponding sub-periods in the past are obtained according to historical information and a data transmission rate in the sub-period Tj in the future is estimated based on the data transmission rates in the plurality of corresponding sub-periods in the past. The method of estimating data transmission rate DRT in the time period T of future as described previously may be used to estimate data transmission rate DRTj in the sub-period Tj of future. In one specific example, as to a certain preliminary candidate LUN, it is desired to predict its data transmission rate 12 hours in future. Then, the whole time period P of the future 12 hours is divided into 12 sub-periods, with each sub-period Tj corresponding to 1 hour duration. For each sub-period Tj, as mentioned previously, data transmission rate DRTj is estimated. Next, based on the estimated data transmission rates DRTj in respective sub-periods Tj, the data transmission rate in time period P of future may be obtained. For example, the estimated data transmission rates DRTj in respective sub-periods Tj may be computed in combination (e.g., summed, averaged, etc.) so as to obtain the data transmission rate of the total time period P.

It should be appreciated that the specific formulas and algorithms above may further be modified, thereby resulting in other variant methods to estimate data transmission rate in a future time period. These variant methods are also comprised in the scope of concept of the invention.

With any of the approaches above, data transmission rate in a future time period may be estimated for any logical unit. Hence, in step 324, a data transmission rate in a future time period may be estimated for each logical unit of the at least one preliminary candidate logical unit selected in step 322. In one embodiment, the logical unit having a maximum estimated data transmission rate is selected from the primary candidate logical units as the final candidate logical unit.

In order to estimate the bandwidth usage by respective preliminary candidate logical units more comprehensively in a future time period, in one embodiment, step 324 further comprises, estimating data rate contribution of the at least one preliminary candidate logical unit in a future time period based on the estimated data transmission rate in the future time period, and selecting the candidate logical unit based on the data rate contribution. In one example, based on the estimated data transmission rate in a future time period, the data rate contribution is estimated by further considering at least one of the priority of the preliminary candidate logical unit and relevancy of respective logical units in data transmission rate.

In one example, the data rate contribution is estimated by considering the priority of the preliminary candidate logical unit. Specifically, the data rate contribution C of a certain preliminary candidate logical unit in a future time period T may be estimated as: C=DRT*Wp, where DRT is the estimated data transmission rate of the primary candidate logical unit in the future time period T, and Wp is a weight factor related to the priority of the preliminary candidate logical unit. In one example, the higher the priority of the preliminary candidate logical unit, the smaller the corresponding Wp.

In one example, the data rate contribution is estimated by considering the relevance of respective logical units in terms of data transmission rate. More specifically, relevance between the preliminary candidate logical unit and the target logical unit in terms of data transmission rate is considered. In particular, in one example, data transmission rates of the preliminary candidate logical unit LUN K and of the target logical unit LUN T in a time period T of future, i.e., K-DRT and T-DRT, are respectively estimated and the data rate contribution C of the preliminary candidate logical unit LUN K can be estimated as: C=Min (K-DRT, T-DRT)/Max (K-DRT, T-DRT). In another example, the future time period P is divided into a plurality of sub-periods, and for each sub-period Tj, as described previously, data transmission rates of the preliminary candidate logical unit LUN K, and of the target logical unit LUN T, K-DRTj and T-DRTj, are estimated respectively. Thus, the data rate contribution C of the preliminary candidate logical unit LUN K in the future time period P may be estimated as: C=ΣMin (K-DRTj, T-DRTj)/Max (K-DRTj, T-DRTj).

In one example, the data rate contribution is estimated considering both the priority and relevance of the preliminary candidate logical unit. In addition, it may be appreciated that the data rate contribution of the preliminary candidate logical unit may be evaluated by further considering more factors on the basis of the examples described above in detail.

On the basis of obtaining through estimation the data rate contribution of respective preliminary candidate logical units, in one embodiment, the logical unit having a maximum data rate contribution is selected as the candidate logical unit. In another alternative embodiment, a plurality of logical units having data rate contributions exceeding a threshold are selected as candidate logical units at the same time.

Figure 5:
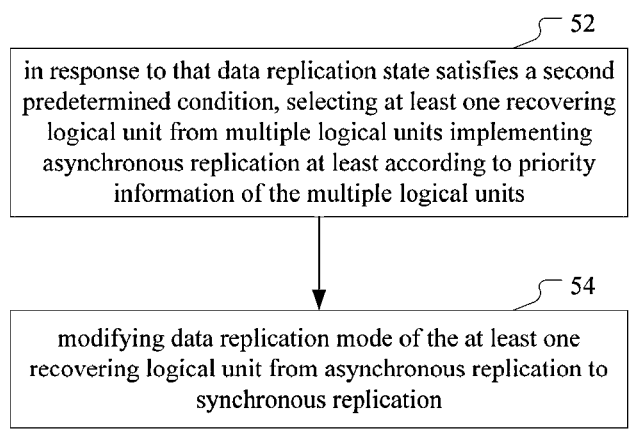
FIG. 5 shows a flowchart of recovering synchronous replication according to one embodiment.

It should be appreciated that after several candidate logical units are selected and their data replication modes are degraded, the bandwidth usage between the primary storage device and the secondary storage device will decrease accordingly. Therefore, in a proper situation with allowable bandwidth, logical units implementing asynchronous replication may be recovered to a synchronous replication state. Accordingly, in one embodiment, managing a data replication mode further comprises recovering synchronous replication. FIG. 5 shows a flowchart of recovering synchronous replication according to one embodiment. As shown in FIG. 5, in step 52, in response to that data replication state between the primary storage device and the secondary storage device satisfying a second predetermined condition, at least one recovering logical unit is selected from a plurality of logical units implementing asynchronous replication in the primary storage device at least according to the priority information of the plurality of logical units; and in step 54, the data replication mode of the at least one recovering logical unit is modified from asynchronous replication to synchronous replication.

Specifically, in step 52, in a case where the data replication state satisfies the second predetermined condition, at least one recovering logical unit is selected. It should be appreciated that the second predetermined condition corresponds to a state in which network resources between the primary storage device and the secondary storage device are enough to allow more synchronous replications. Specifically, in one embodiment, the second predetermined condition may be that the total data transmission rate of data replication is less than a second rate threshold. In particular, the second rate threshold is a value related to available bandwidth of the primary storage device. For example, in one example, the second rate threshold is set to a predetermined ratio of a maximum available bandwidth of the primary storage device, such as 50% thereof. Once the total data transmission rate of data replication between the primary storage device and the secondary storage device is less than the second rate threshold it may be considered that the bandwidth of the primary storage device has not been fully occupied, thereby having space to support more logical units for synchronous replication. In one embodiment, the second predetermined condition may be that write latencies of respective logical units in the primary storage device are less than the second latency threshold. In other embodiments, the second predetermined condition may also be reflected by other parameters associated with the data replication state. In one embodiment, to avoid too frequent switching of replication mode, in step 52, the selection of the recovering logical unit is made only when data replication state satisfies the second predetermined condition with duration exceeding a time threshold.

In order to select the recovering logical unit, the priority information and replication modes of respective logical units in the primary storage device are referred to again. In one embodiment, logical units implementing asynchronous replication are determined first and then the logical unit having highest or higher priority is selected as the recovering logical unit.

According to one embodiment, data transmission rates of respective logical units are taken into consideration and, thus, the recovering logical unit is selected based on the priority information and data transmission rates. Similarly, the data transmission rates may be current data transmission rates or data transmission rates in a future time period estimated based on historical information. It should be appreciated that the process of selecting the recovering logical unit in step 52 is a reverse process relative to the process of selecting the candidate logical unit in step 32. Step 32 is intended to select a logical unit having a lower priority and a larger data transmission rate for degradation so as to alleviate bandwidth pressure to the greatest extent, without impacting the execution of important applications. In contrast, step 52 is intended to select a logical unit having a higher priority and a smaller data transmission rate for recovery, so as to guarantee the execution of important applications to the greatest extent while avoiding introducing too much pressure on bandwidth. Therefore, those skilled in the art may modify the specific ways of executing step 32 correspondingly so as to apply them to step 52.

On the basis of selecting at least one recovering logical unit in step 52, in step 54 the replication mode of the at least one recovering logical unit is modified so that it is recovered from asynchronous replication mode to synchronous replication mode.

Through degrading the replication mode of the candidate logical unit to asynchronous replication in an appropriate situation and optionally recovering the replication mode of the recovering logical unit to synchronous replication, a switch between synchronous replication and asynchronous replication may be performed per logical unit so as to make the primary storage device better adapt to different network conditions.

Figure 6:
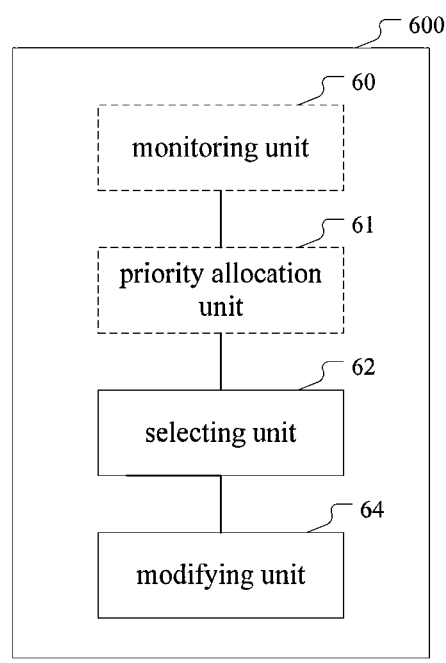
FIG. 6 shows a schematic block diagram of an apparatus according to one embodiment of the disclosure.

In the same inventive concept, the an apparatus for managing data replication mode between a primary storage device and a secondary storage device is shown in FIG. 6 according to one embodiment of the disclosure. In FIG. 6, the apparatus for managing data replication mode is shown as 600 on the whole. Specifically, the apparatus 600 comprises: a selecting unit 62 configured to select, in response to that data replication state between the primary storage device and the secondary storage device satisfying a first predetermined condition, at least one candidate logical unit from a plurality of logical units implementing synchronous replication in the primary storage device at least according to priority information of the plurality of logical units; and a modifying unit 64 configured to modify data replication mode of the at least one candidate logical unit from synchronous replication to asynchronous replication.

In one embodiment, the first predetermined condition comprises at least one of the following: a total data transmission rate of data replication is greater than a first rate threshold; and write latency of at least one logical unit of the plurality of logical units is greater than a first latency threshold.

In one embodiment, the apparatus 600 further comprises a monitoring unit 60 (denoted by dashed line) configured to monitor parameters related to data replication state between the primary storage device and the secondary storage device, the parameters comprising at least one of a total data transmission rate or write latencies of the plurality of logical units.

According to one embodiment, the apparatus 600 further comprises a priority allocation unit 61 (denoted by dashed line) configured to allocate logical units contained in the primary storage device with priority information.

According to one embodiment, the selecting unit 62 is configured to: determine logical units implementing synchronous replication in the primary storage device; and select a logical unit having the lowest priority from the logical units implementing synchronous replication as the candidate logical unit.

According to one embodiment, the selecting unit 62 is configured to select at least one candidate logical unit further according to data transmission rates of the plurality of logical units.

In one embodiment, the selecting unit 62 (not shown) comprises: a first selecting module configured to select at least one preliminary candidate logical unit having a priority lower than a specific priority from logical units implementing synchronous replication in the primary storage device; and a second selecting module configured to select at least one candidate logical unit from the at least one preliminary candidate logical unit according to data transmission rate of the at least one preliminary candidate logical unit.

According to one embodiment, the second selecting module is configured to select at least one candidate logical unit according to current data transmission rate of the at least one preliminary candidate logical unit.

According to one embodiment, the second selecting module is configured to estimate data transmission rate in a future time period according to historical information of data transmission rate of the at least one preliminary candidate logical unit; and select at least one candidate logical unit according to the estimated data transmission rate.

According to one embodiment, the second selecting module is configured to: obtain data transmission rates of the at least one preliminary candidate logical unit in a plurality of corresponding time periods in the past according to the historical information of the at least one preliminary candidate logical unit; and estimate the data transmission rate in the future time period based on the data transmission rates in the plurality of corresponding time periods in the past.

According to one embodiment, the second selecting module is further configured to: estimate data rate contribution of the at least one preliminary candidate logical unit in the future time period based on the estimated data transmission rate in the future time period; and select at least one candidate logical unit based on the data rate contribution.

According to one embodiment, the apparatus 600 further comprises a recovering unit (not shown) configured to: select, in response to that data replication state between the primary storage device and the secondary storage device satisfies a second predetermined condition, at least one recovering logical unit from another plurality of logical units implementing asynchronous replication in the primary storage device at least according to priority information of the another plurality of logical units; and modify data replication mode of the at least one recovering logical unit from asynchronous replication to synchronous replication. In one embodiment, the second predetermined condition comprises at least one of the following: a total data transmission rate of data replication is less than a second rate threshold; and write latency of each logical unit is less than a second latency threshold.

The specific ways of executing respective units of the apparatus 600 for managing data replication mode may be obtained referring to the above description of the processes in combination with FIG. 3 to FIG. 5.

In one embodiment, the apparatus 600 is arranged in the primary storage device to manage replication modes of its respective logical units. In another embodiment, the apparatus 600 acts as a separate tool in communication with the primary storage device to implement its management function.

With the method and apparatus of the embodiments of the present invention, a switch between synchronous replication and asynchronous replication can be directed to a logical unit as a unit, so as to make the primary storage device better adapt to different network conditions and satisfy different requirements for disaster tolerance and application performance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for managing a data replication mode between a primary storage device and a secondary storage device, comprising:
   in response to a data replication state between the primary storage device and the secondary storage device satisfying a first predetermined condition, selecting, by a selecting unit, at least one candidate logical unit from a plurality of logical units that are implementing synchronous replication in the primary storage device based on priority information of the plurality of logical units, wherein the selecting, by a selecting unit, at least one candidate logical unit further includes selecting the at least one candidate logical unit from at least one preliminary candidate logical unit by:
      estimating a data transmission rate in a future time period according to historical information of data transmission rate of the at least one preliminary candidate logical unit by obtaining data transmission rates of the at least one preliminary candidate logical unit in a plurality of corresponding past time periods according to the historical information of the at least one preliminary candidate logical unit and estimating the data transmission rate in the future time period based on the data transmission rates in the plurality of corresponding past time periods; and
      selecting the at least one candidate logical unit according to the estimated data transmission rate; and
   modifying, by a modifying unit, a data replication mode of the at least one candidate logical unit that is selected from synchronous replication to asynchronous replication to reduce an impact of bandwidth pressure on performance when performing data replication, wherein the first predetermined condition includes at least one of a total data transmission rate of data replication being greater than a first rate threshold and write latency of at least one of the plurality of logical units being greater than a first latency threshold.

2. The method of claim 1, wherein the selecting, by a selecting unit, at least one candidate logical unit further comprises selecting the at least one candidate logical unit according to data transmission rates of the plurality of logical units.

3. The method of claim 2, wherein the selecting, by a selecting unit, at least one candidate logical unit further comprises:
   selecting, from the plurality of logical units, the at least one preliminary candidate logical unit having a priority lower than a specific priority; and
   selecting the at least one candidate logical unit from the at least one preliminary candidate logical unit according to a data transmission rate of the at least one preliminary candidate logical unit.

4. The method of claim 3, wherein the selecting the at least one candidate logical unit from the at least one preliminary candidate logical unit further comprises:
   selecting the at least one candidate logical unit according to a current data transmission rate of the at least one preliminary candidate logical unit.

5. The method of claim 1, further comprising:
   estimating data rate contribution of the at least one preliminary candidate logical unit in the future time period based on the estimated data transmission rate in the future time period; and
   selecting the at least one candidate logical unit based on the data rate contribution.

6. The method of claim 1, further comprising:
   in response to the data replication state between the primary storage device and the secondary storage device satisfying a second predetermined condition, selecting at least one recovering logical unit from another plurality of logical units implementing asynchronous replication in the primary storage device at least according to priority information of the another plurality of logical units; and
   modifying a data replication mode of the at least one recovering logical unit from asynchronous replication to synchronous replication.

7. The method of claim 6, wherein the second predetermined condition comprises at least one of a total data transmission rate of data replication being less than a second rate threshold and write latency of each of the plurality of logical units in the primary storage device being less than a second latency threshold.

8. An apparatus for managing a data replication mode between a primary storage device and a secondary storage device, comprising:
   a selecting unit configured to select, in response to a data replication state between the primary storage device and the secondary storage device satisfying a first predetermined condition, at least one candidate logical unit from a plurality of logical units that are implementing synchronous replication in the primary storage device based on priority information of the plurality of logical units; and
   a modifying unit configured to modify a data replication mode of the at least one candidate logical unit that is selected from synchronous replication to asynchronous replication to reduce an impact of bandwidth pressure on performance when performing data replication, wherein the first predetermined condition includes at least one of a total data transmission rate of data replication being greater than a first rate threshold and write latency of at least one of the plurality of logical units being greater than a first latency threshold, wherein the selecting unit includes a first selecting module and a second selecting module that is configured to:
      estimate a data transmission rate in a future time period according to historical information of a data transmission rate of the at least one preliminary candidate logical unit by obtaining data transmission rates of the at least one preliminary candidate logical unit in a plurality of corresponding past time periods according to the historical information of the at least one preliminary candidate logical unit and estimating the data transmission rate in the future time period based on the data transmission rates in the plurality of corresponding past time periods; and select the at least one candidate logical unit according to the estimated data transmission rate.

9. The apparatus of claim 8, wherein the selecting unit is further configured to select the at least one candidate logical unit according to data transmission rates of the plurality of logical units.

10. The apparatus of claim 9, wherein the first selecting module is configured to select, from the plurality of logical units, the at least one preliminary candidate logical unit having a priority lower than a specific priority the second selecting module is configured to select the at least one candidate logical unit from the at least one preliminary candidate logical unit according to a data transmission rate of the at least one preliminary candidate logical unit.

11. The apparatus of claim 10, wherein the second selecting module is further configured to select the at least one candidate logical unit according to current data transmission rate of the at least one preliminary candidate logical unit.

12. The apparatus of claim 8, wherein the second selecting module is further configured to:

estimate data rate contribution of the at least one preliminary candidate logical unit in the future time period based on the estimated data transmission rate in the future time period; and select the at least one candidate logical unit based on the data rate contribution.

13. The apparatus of claim 8, further comprising a recovering unit configured to:

select, in response to the data replication state between the primary storage device and the secondary storage device satisfying a second predetermined condition at least one recovering logical unit from another plurality of logical units implementing asynchronous replication in the primary storage device at least according to priority information of the another plurality of logical units; and modify a data replication mode of the at least one recovering logical unit from asynchronous replication to synchronous replication.

14. A computer program product, comprising:

a computer readable storage device; and program code stored on the computer readable storage device, wherein the program code, when executed by a processor, configures the processor to:

in response to a data replication state between a primary storage device and a secondary storage device satisfying a first predetermined condition, selecting, by a selecting unit, at least one candidate logical unit from a plurality of logical units that are implementing synchronous replication in the primary storage device based on priority information of the plurality of logical units; and modifying a data replication mode of the at least one candidate logical unit that is selected from synchronous replication to asynchronous replication to reduce an impact of bandwidth pressure on performance when performing data replication, wherein the first predetermined condition includes at least one of a total data transmission rate of data replication being greater than a first rate threshold and write latency of at least one of the plurality of logical units being greater than a first latency threshold, wherein the selecting unit includes a first selecting module and a second selecting module that is configured to:

estimate a data transmission rate in a future time period according to historical information of a data transmission rate of at least one preliminary candidate logical unit by obtaining data transmission rates of the at least one preliminary candidate logical unit in a plurality of corresponding past time periods according to the historical information of the at least one preliminary candidate logical unit and estimating the data transmission rate in the future time period based on the data transmission rates in the plurality of corresponding past time periods; and select the at least one candidate logical unit according to the estimated data transmission rate.

* * * * *